Jan. 11, 1927.

G. F. FISHER 1,613,697

METHOD OF MANUFACTURING HOLLOW CUSHION TIRES

Filed July 10, 1922

Inventor.
George F. Fisher,
By his Attorney.
Ernest Hopkinson

Patented Jan. 11, 1927.

1,613,697

UNITED STATES PATENT OFFICE.

GEORGE F. FISHER, OF ROSELLE, NEW JERSEY, ASSIGNOR TO MORGAN & WRIGHT, A CORPORATION OF MICHIGAN.

METHOD OF MANUFACTURING HOLLOW CUSHION TIRES.

Application filed July 10, 1922. Serial No. 573,868.

This invention relates to solid tires of the cushioning type having a longitudinally extending recess or cavity and secured by vulcanization to a metallic rim. The comprehensive object of the present invention is to provide a simple and economic method of manufacturing a hollow cushion tire, which will enable the tire to be vulcanized to a one-piece imperforate type of metallic rim while obtaining the desirable resiliency of a cushion or hollow type of solid tire. An embodiment of the invention is illustrated in the accompanying drawings in which:—

Figure 1:
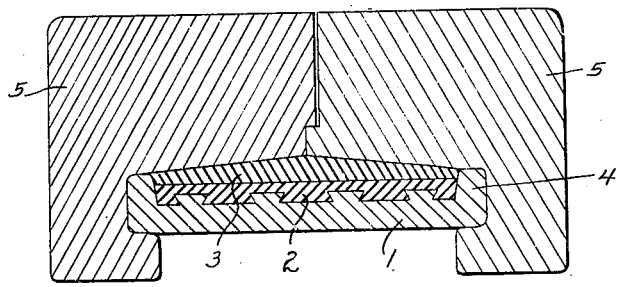
Fig. 1 shows the base portion of the tire on a metallic rim.
Figure 2:
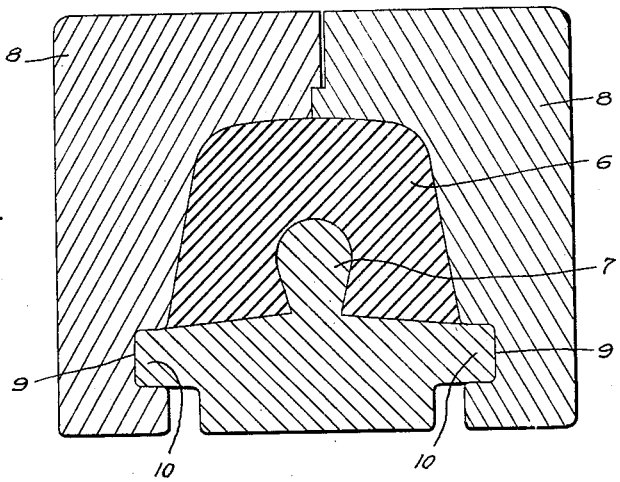
Fig. 2 shows how the hollow and relatively soft body portion may be pre-formed in a more or less completely vulcanized condition.
Figure 3:
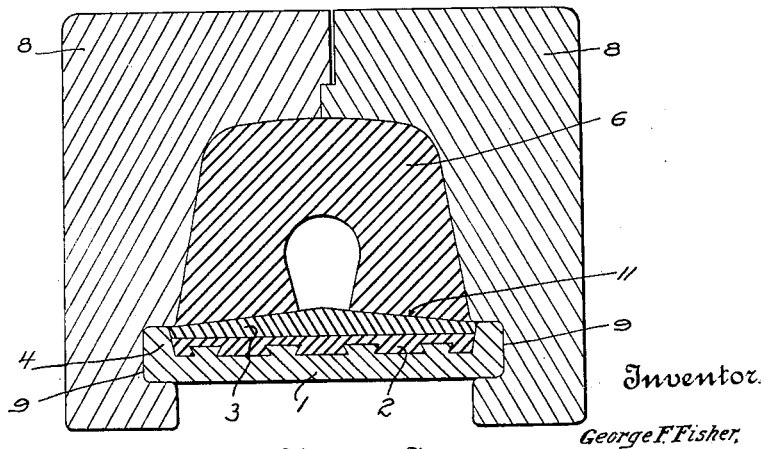

And Fig. 3 shows one way of assembling and uniting the body and base portions of the tire in a complete or finished condition confined by mold members which may be used if desired.

According to my invention, the base and body portions of the tire are pre-formed separately. While this may be accomplished variously, a convenient way is to assemble on or about a metallic rim 1, vulcanizable rubber composition 2 of a suitable nature to bond well to metal, one, for instance, high in sulphur and with preferably a powdered metal, such as aluminum, distributed in the mass. This base portion may be built up on the rim in any suitable manner, as by winding a strip or strips of stock one or more times around the rim, or by tubing the material. Preferably, the hardest composition is located immediately adjacent the metallic rim and a slightly softer composition, such as indicated at 3, located above the same and attaining a thickness approximating the height of the side flanges 4. And preferably, but not necessarily, the base portion has its upper surface inclined upwardly towards the center of its outer periphery. After the base has been formed, it is then vulcanized in any suitable manner, as by wrapping or by confining in the sections of a mold, indicated at 5.

The body portion of the tire, indicated generally at 6, is made of vulcanizable rubber composition, which cures in a softer and more yielding condition than the base portion, it being amassed in any suitable manner, as by tubing or plying up a strip of stock about a form or sectional core 7, and given a more or less permanent shape by vulcanizing partially or completely between the sections 8 of a mold. Preferably, the latter are provided with grooves 9 in their inner periphery of suitable dimensions not only to receive the lateral flanges 10 of the form or core sections, but also to snugly receive and hold the base portion and metallic rim.

After the base and body portions have been separately formed and vulcanized (more or less completely), they are then united together permanently. While this may be accomplished by the application of heat with the tire confined in a mold, as indicated in Fig. 3, it is preferable to employ a cold or self-curing cement requiring very little or no heat above room temperature to unite the bottom faces of the side walls of the body portion to the upper faces of the base portion. The cement may be applied to either or both of the opposed surfaces but it is preferable to exert pressure on the parts while seaming them together, as indicated at 11.

It is quite obvious that the invention is capable of many changes and is not confined to the details specifically disclosed, the degree or extent of separate vulcanization of the base and body portions being variable and depending upon the use and duration of use of heat in the final uniting operation of the body to the base portion. The form of the cavity in the body portion is obviously variable, likewise the shape and configuration of the metallic rim and the opposed faces of the base and body portions.

The internal diameter of the body portion is of course made equal to, or slightly less than, the external diameter of the base portion upon which the side walls of the body are seated. And preferably, the diameter common to the seamed together faces is approximately equal to the diameter of the free edges of the rim flanges 4, if the rim is provided therewith. But this diameter may be greater or less than that of the free edges of the rim flanges, the latter being of particular advantage in concealing the seam from sight and protecting it. When cement is used to unite the parts together, as is the preferred procedure, it is desirable to apply pressure to secure a strong union, and this pressure may be derived from external confining molds or wrappings, or by making the body portion of a diameter requiring it to be stretched in order to seat upon the outer periphery of the base portion.

From the foregoing it will be seen that I have devised an extremely simple way of manufacturing the cushion or hollow type of solid tire, that this has been obtained without requiring any special treatment of the metallic rim, and that the parts of the tire may be vulcanized more perfectly, or in a manner better suited to the requirements of the tire in service than was possible heretofore.

For an understanding of the scope of the invention, reference should be made to the accompanying claims.

Having thus described my invention, what I claim and desire to protect by Letters Patent is:

1. A method of manufacturing a hollow cushion tire with a hard rubber base vulcanized to a metallic rim which consists in forming relatively soft vulcanizable rubber composition into an annular body portion having spaced side walls and a tread encircling a longitudinally extending cavity, forming vulcanizable rubber composition harder than that of the body portion on a metallic rim into a hard rubber base portion, at least partially vulcanizing the body and base portions separately from one another, and permanently uniting the body and base portions to form a complete tire of the hollow cushioning type.

2. A method of manufacturing a hollow cushion tire with a hard rubber base vulcanized to a metallic rim which consists in forming a relatively soft vulcanizable rubber composition into an annular body portion provided with a longitudinally extending cavity and spaced side walls supporting a tread, forming a base portion of vulcanizable rubber composition on and about a metallic rim to substantially the height of the rim flanges and with relatively hard vulcanizable rubber composition in immediate contact with the rim, vulcanizing the body and base portions separately, and subsequently cementitiously uniting the body and base portions to form the hollow tire complete on the rim.

3. A method of manufacturing a cushion tire which consists in, forming a base portion of vulcanizable rubber composition on and about a metallic rim to substantially the height of the rim flanges with relatively hard vulcanizable rubber composition contiguous the rim, forming a relatively soft vulcanizable rubber into an annular body portion recessed to enhance the cushioning properties of the finished article, at least partially vulcanizing the body and base portions separately from one another, and permanently uniting the body and base portions to form a complete cushion tire.

4. A method of manufacturing a cushion tire which comprises forming a layer of a base portion upon a rim, mounting a second layer of the base portion upon the first layer, vulcanizing the two layers together upon the rim to form a base, forming a vulcanized annular body portion having an annular groove upon its inner surface, and permanently mounting the body portion upon the base portion whereby the annular groove is closed by the base portion.

5. A method of manufacturing a cushion tire which comprises forming upon a rim a base member of vulcanizable rubber composition having an outer surface which inclines upwardly toward its center, vulcanizing the base portion, forming an annular body member, the inner periphery of which tapers inwardly and is of slightly less diameter than the outer periphery of the base, vulcanizing the body member and assembling the body member upon the base member.

6. A method of manufacturing a cushion tire which comprises forming upon a rim a base member of vulcanizable rubber composition having an outer surface which inclines upwardly toward its center, vulcanizing the base portion, forming an annular body member, the inner periphery of which tapers inwardly, applying cement to the inner surface of the body member and the outer surface of the base member, and assembling the body member upon the base member.

Signed at New York city, county of New York, and State of New York, this 8th day of July, 1922.

GEORGE F. FISHER.